United States Patent

Monro

(10) Patent No.: US 7,650,020 B2
(45) Date of Patent: Jan. 19, 2010

(54) IDENTIFICATION OF IMAGE CHARACTERISTICS

(76) Inventor: Donald Martin Monro, 6 The Lays, Goose Street, Beckington, Somerset (GB) BA11 6RS ( * ) Notice: Subject to any disclaimer, the term of this patent is extended or adjusted under 35 U.S.C. 154(b) by 0 days.

(21) Appl. No.: 11/596,655

(22) PCT Filed: Jun. 1, 2005

(86) PCT No.: PCT/GB2005/002156

§ 371 (c)(1),
(2), (4) Date: Dec. 19, 2007

(87) PCT Pub. No.: WO2005/119581

PCT Pub. Date: Dec. 15, 2005

(65) Prior Publication Data

US 2008/0187183 A1    Aug. 7, 2008

(30) Foreign Application Priority Data

Jun. 1, 2004    (GB)    ................................ 0412175.2

(51) Int. Cl.
*G06K 9/00* (2006.01)
*G06K 9/36* (2006.01)
*H04N 5/225* (2006.01)

(52) U.S. Cl. ....................... 382/115; 382/117; 382/276; 348/207.99

(58) Field of Classification Search ................. 382/115, 382/117, 293, 276, 118, 100; 348/207.99, 348/335, 363, 364; 378/98.7, 108, 97, 110; 250/201.3, 229; 359/683, 676, 698; 351/221
See application file for complete search history.

(56) References Cited

U.S. PATENT DOCUMENTS

| | | | |
|---|---|---|---|
| 3,845,466 A | 10/1974 | Hong | |
| 4,641,349 A | 2/1987 | Flom et al. | |
| 4,817,183 A | 3/1989 | Sparrow | |
| 5,291,560 A | 3/1994 | Daugman | |
| 5,572,596 A | 11/1996 | Wildes et al. | |
| 5,631,971 A | 5/1997 | Sparrow et al. | |
| 5,751,836 A | 5/1998 | Wildes et al. | |
| 5,901,238 A | 5/1999 | Matsushita | |
| 5,956,122 A | 9/1999 | Doster | |
| 6,229,906 B1 | 5/2001 | Pu et al. | |
| 6,247,813 B1 * | 6/2001 | Kim et al. | ............. 351/206 |
| 6,360,021 B1 * | 3/2002 | McCarthy et al. | ............. 382/254 |

(Continued)

FOREIGN PATENT DOCUMENTS

EP    1 403 811 A    3/2004

(Continued)

OTHER PUBLICATIONS

International Search Report for PCT/GB2005/002156 mailed Aug. 31, 2005.

*Primary Examiner*—Sheela C Chawan
(74) *Attorney, Agent, or Firm*—Ungaretti & Harris LLP

(57) ABSTRACT

A method of identifying the characteristics of an image such as an iris image or other biometric image comprises taking repeated scans across the image and determining the variability between those scans. By taking a sequence of scans, a two-dimensional variation code (70) is built up. This may then be compared with a stored library of similar variation codes to identify the individual.

22 Claims, 2 Drawing Sheets

U.S. PATENT DOCUMENTS

| | | | |
|---|---|---|---|
| 6,424,727 B1 * | 7/2002 | Musgrave et al. | 382/117 |
| 6,526,160 B1 * | 2/2003 | Ito | 382/117 |
| 6,757,411 B2 * | 6/2004 | Chau | 382/125 |
| 6,909,808 B2 * | 6/2005 | Stanek | 382/232 |
| 7,009,495 B2 * | 3/2006 | Hughes et al. | 340/10.2 |
| 7,136,514 B1 * | 11/2006 | Wong | 382/124 |
| 7,302,087 B2 * | 11/2007 | Cho | 382/118 |

FOREIGN PATENT DOCUMENTS

WO    WO 02/065782 A    8/2002

* cited by examiner

IDENTIFICATION OF IMAGE CHARACTERISTICS

The present invention relates to a method and apparatus for identification of image characteristics. In particular, although not exclusively, it relates to biometric identification of an individual using an identifying image, for example of an iris, face, hand, ear or fingerprint.

A variety of biometrically-based techniques for the identification of individuals have been proposed, many of which rely on iris recognition. Existing patents in this field include the following: U.S. Pat. No. 4,641,349, Flom & Safir; U.S. Pat. No. 5,572,596, Wildes et al; U.S. Pat. No. 5,751,836, Wildes et al; U.S. Pat. No. 5,901,238, Matsushita; U.S. Pat. No. 5,956,122, Doster; U.S. Pat. No. 6,229,906, Pu & Psaltis; U.S. Pat. No. 6,247,813, Kim & Ryoo; U.S. Pat. No. 6,526,160, Ito. WO-A-02/065782 is not iris-related, but discloses a method of generating and matching multimedia content using hashes.

With conventional iris recognition techniques, achieving a commercially acceptable false acceptance rate (where an individual is improperly identified as being known to the system) is in practice not too technically demanding. What is much more difficult, however, is achieving an acceptable false rejection rate (where a known individual is improperly rejected by the system). High false rejection rates in a commercial system are not conducive to easy consumer acceptance of the technology because of the anger and embarrassment that may easily be caused when a person who should be known to the system is incorrectly denied access.

According to a first aspect of the present invention there is provided a method of identifying a characteristic of an image comprising the steps of:
(a) obtaining from the image a plurality of digitised sample strings, each representative of one or more linear image samples;
(b) generating from the sample strings a variation code indicative of variation between the sample strings; and
(c) identifying a characteristic of the image in dependence upon the variation code.

According to a second aspect there is provided apparatus for identifying a characteristic of an image comprising:
(a) means for obtaining from the image a plurality of digitised sample strings, each representative of one or more linear image samples;
(b) means for generating from the sample strings a variation code indicative of variation between the sample strings; and
(c) means for identifying a characteristic of the image in dependence upon the variation code.

The invention further extends to a computer program arranged to execute a method as previously defined. It further extends to a computer-readable medium holding any such computer program.

The preferred application of the present invention is in the field of iris recognition. A normalised form of the iris image is first prepared as is known in the field. A standard signal processing transform is then carried out in selected positions throughout the image of variable length, orientation and spacing. The transformation might be an FFT but others are possible. The transforms are then compared again according to some ordering of the transforms, and converted to one bit signals, for example 0 for greater and 1 for less or equal. This series of binary signal fragments are then compared to stored fragments. If a sufficient number of matches is found, within a specified Hamming distance, then a match is obtained. If not, there is no match.

The preferred embodiment is simpler than existing classification methods, so that it operates faster. It is also 'Scalable' meaning that its performance can be tuned over a range of False Acceptance Rates (FAR) and False Rejection Rates (FRR). The classification method is capable of excellent False Acceptance Rates, i.e. effectively zero—comparable to fingerprint and DNA. In an identification task this means that the wrong person is (almost) never admitted. Arguably in identity verification this is unnecessary; one in 10,000 would be acceptable. The preferred algorithm of the present invention provides false acceptance rates which are more than adequate for most if not all applications, while at the same time providing significantly improved false rejection rates.

The invention may be carried into practice in a number of ways and one specific iris-recognition embodiment will now be described, by way of example, with reference to the accompanying drawings, in which.

The primary embodiment to be described below will be that of iris identification, although it will of course be understood that an identical approach may be used to identify specific or unique characteristics of any image, whether biometric or not. Suitable biometric images which may be used for biometric identification include images of the face, hand, ear, fingerprint or indeed any other identifying image of an individual.

Figure 1:
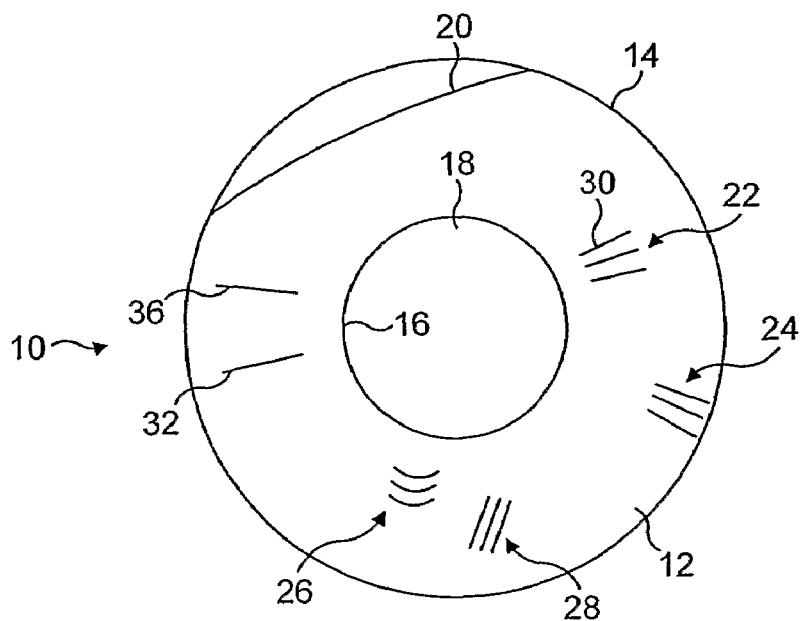
FIG. 1 is a schematic drawing of a human or animal iris, illustrating a preferred embodiment of the invention.

Turning first to FIG. 1, this shows in schematic form the outline of a human eye 10. The eye has an annular iris 12, generally defined by an outer periphery 14 and an inner periphery 16, the latter representing the boundary between the iris 12 and the pupil 18. An eyelid 20 may occlude part of the iris, as shown. The process of identification of an individual and/or uniquely characterising the iris starts by taking a photographic other image of the eye, preferably in colour. Conventional means, such as for example those disclosed in U.S. Pat. No. 5,291,560, are used to identify the portion of interest, namely the iris 12 itself. At least two one-dimensional scans 32,36 are made within the iris portion, each scan recording the intensity and/or colour of that part of the iris defined by the scan line. Preferably, each scan line is straight, although that is by no means essential, and in this specification the word "linear" in the expression "linear image samples" merely indicates that image samples are taken along a line, which line need not be a straight line.

Figure 4:
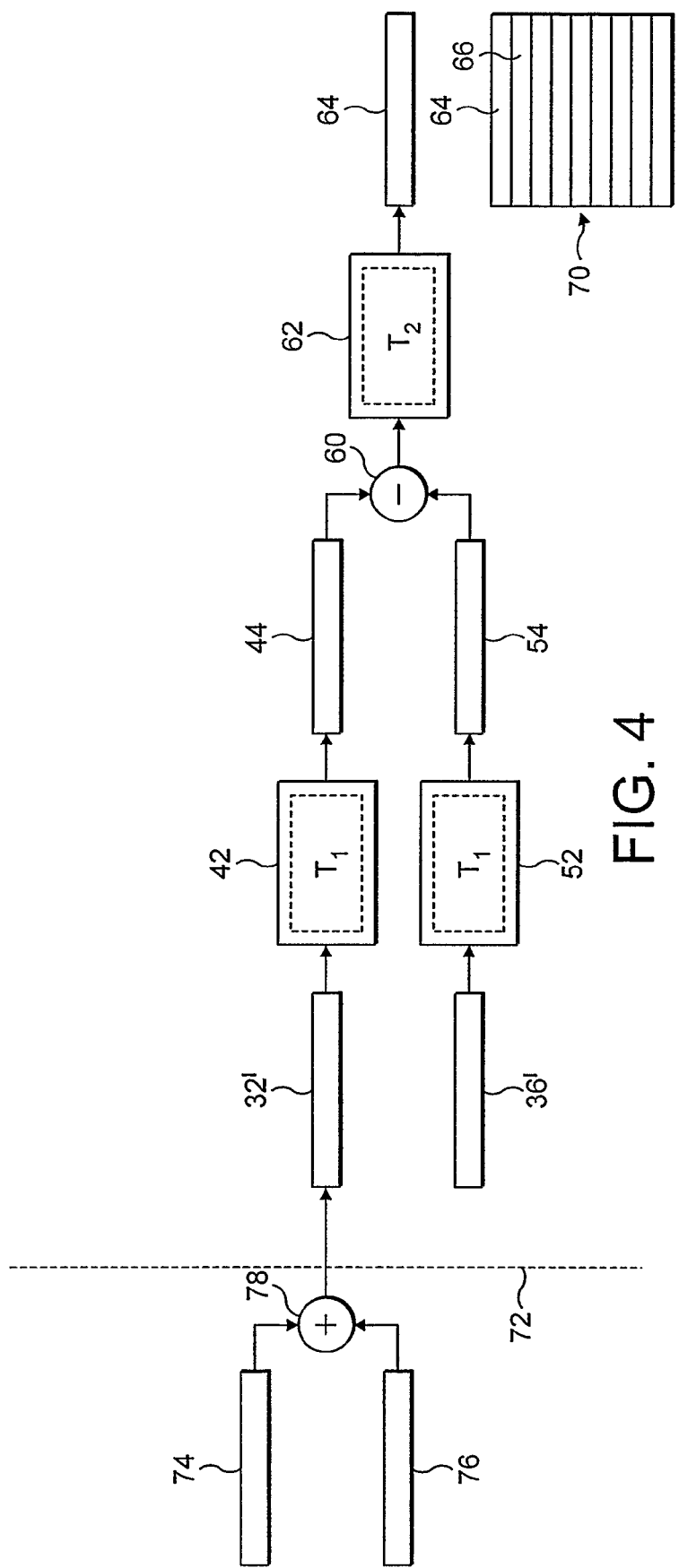
FIG. 4 shows in block diagram form the way in which the characteristics of the iris of FIG. 1 or the more general image of FIG. 3, are identified.

FIG. 4 illustrates in box diagram schematic form the method and/or apparatus by which the image is to be uniquely characterised, making use of these one-dimensional scans 32, 36. It will be understood of course that each of the elements shown in FIG. 4 may be implemented either in hardware or in software.

In one embodiment, the scans 32,36 define respective one-dimensional data strings 32', 36', these being fed into respective transforms 42, 52. Typically, the transform used may be a frequency transform such as for example a wavelet transform, a fast Fourier transform, or a discrete cosine transform. The respective outputs 44,54 of the transforms are differenced at 60, and optionally transformed again at 62, to generate a variation output 64. In the preferred embodiment, the transform at step 62 simply converts the output of the differencing step 60 into binary, so that the variation outputs at 64 takes the form of a one-dimensional binary string. Alternatively, quantisation could be carried out to any other required level, with the output string 64 then being defined by a string of numbers modulo N.

The process is then repeated with another pair of scan lines (not shown) on the iris, to generate a second variation output string 66. This process is repeated again as many times as desired to build up a two-dimensional variation code 70. Where the individual outputs 64, 66 are binary, it will be understood that the overall two-dimensional variation code 70 will have an appearance (if plotted by mark and space) rather similar to that of a two-dimensional barcode.

The variation code 70 represents a unique characterisation of the original iris image, and hence a unique biometric characterisation/identification of the individual whose iris it is.

Where it is required to determine whether the individual is known to the system, a comparison may then be made between the variation code 70 and similar variation codes which have been pre-recorded from known individuals. Any convenient matching algorithm may be used for that purpose: for example, the unknown code may be compared with code from a known individual, bit by bit, and a count taken of the number of bits which are the same. A match is then declared if the number of bits that differ is lower than a defined threshold, either by absolute number or by ratio of mismatches to matches. To ensure rotational independence, it may be desirable to check for a match which starts at any arbitrary location within the stored variation code. Where the variation code 70 is represented by pixels that may take more than two values, a match may be declared if the Hamming distance is less than a defined threshold. More generally, one may define the strength of a match in dependence upon any required metric of the two codes which are being compared.

In an alternative embodiment, also illustrated by FIG. 4, the transforms 42, 52 may be omitted and the difference 60 taken between the raw (or enhanced) digitised scanned strings 44, 54. In such a case, it will normally be desirable for the transform 62 to be a frequency-based signal processing transform, for example a wavelet transform, a fast Fourier transform, or a discrete cosine transform.

In the embodiments shown in FIG. 4, the variation between the strings 44, 54 is determined by means of the differencer 60. It will be understood of course that this may be replaced by any other hardware device or software function which takes as input two or more individual data streams and provides, as output, a string indicative of the variations between the inputs. It would be quite possible, for example, for there to be three or more similar inputs, with the variation device or function determining the bit by bit variation between like bits across all of the input strings. Other approaches to defining variation will no doubt occur to the skilled man.

In order to reduce the effects of noise within a single one-dimensional scan, each individual scan 32, 36 may be replaced with multiple scans 24, 22. Each multiple scan comprises several individual scans 30, these being closely spaced on the image. For clarity the individual scans 30 within the multiple scans 22, 24 are shown as being separated by a greater distance than would be the case in practice.

Now, instead of the data strings 32', 36' of FIG. 4 representing individual scans, they may instead represent an average or weighted average taken over the individual scans of each multiscan 22, 24. This may conveniently be achieved in practice by providing, optionally, the additional hardware or software shown to the left of the dotted line 72 in FIG. 4. Within each multiscan string 74, 76, the individual scans are summed or otherwise averaged at 78, the output of the summer 78 then being fed into the digital signal processing algorithms 42, as described above. It will be understood that in practice the input to each of the individual transforms may be representative of the sum or an averaged or filtered combination of two or more individual closely-spaced scans. The arrangement of FIG. 4 is exemplary only, and not all possibilities are shown.

Turning back to FIG. 1, the individual scans 32, 36 or the multiscans 22, 24 may be located and angled as desired within the iris image. For example, although radial scans may be preferred, concentric scans 26 are also possible, as indeed are scans 28 of any arbitrary position, direction and length. These parameters may be selected according to the application and/or according to the level of matching accuracy required, by experimentation if necessary. Further adjustment of the matching accuracy may be provided by adjustment of the Hamming distance required before a match is accepted.

Where multiscans 22, 24 are undertaken, the areas of each multiscan may be entirely separate or there may be a certain amount of overlap between the individual scans undertaken for a given multiscan, and those undertaken for the next multiscan in the sequence.

Figure 2:
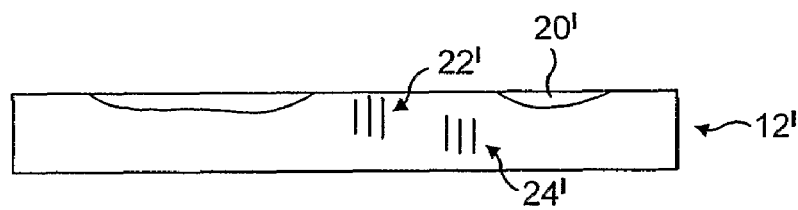
FIG. 2 shows the iris transformed into a rectangular Cartesian co-ordinate system.

In an alternative embodiment, the scans may be taken not directly from the image of the iris, as shown in FIG. 1, but instead from some enhanced and/or transformed and/or normalised image. An example of such a transformed image is shown in FIG. 2, where a radial to Cartesian transformation has converted the original iris image 12 into a "rolled out" image 12', with excluded portions 20' which correspond to the area occluded by the iris 20. Individual scans or multiscans 22', 24' are then taken within this transformed image.

Figure 3:
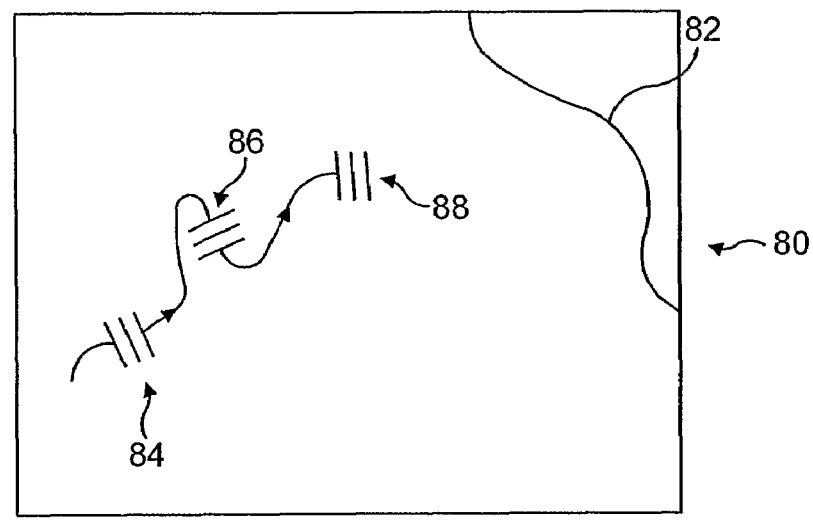
FIG. 3 shows a more general image which may or may not be a transform of an iris.

A more general implementation is illustrated schematically in FIG. 3. Here, we have a generic image 80, possibly with one or more excluded portions 82. Such an image could be representative of an iris or any other raw or transformed biometric image such for example that of a face, hand, ear or fingerprint. Even more generally, the image 80 need not represent a biometric image at all: instead it may simply represent any image which it is desired uniquely to characterise and/or match against previously characterised images. The variation code for this image 80 is then obtained, as before, by scanning a sequence of individual scan lines or multiscans 84, 86, 88.

The invention claimed is:

1. A method of identifying a characteristic of an image comprising the steps of:
   a) obtaining from the image a plurality of digitised sample strings, each sample string representative of one or more linear image samples;
   b) generating from the sample strings a variation code indicative of variation between the sample strings by applying a vector operator to the sample strings to generate a variation code, and
   c) repeating steps (a) and (b) to generate a plurality of variation codes, said variation codes together defining an overall variation code; and
   d) identifying a characteristic of the image in dependence upon all or part of the overall variation code.

2. A method as claimed in claim 1 in which the sample strings are obtained by averaging a respective plurality of individual linear image samples.

3. A method as claimed in claim 1 further including the step of applying a digital transform to the respective sample strings prior to the step of generating the variation code.

4. A method as claimed in claim 3 in which the digital transform is a frequency-transform.

5. A method as claimed in claim 3 in which the digital transform is one of a wavelet transform, a fast Fourier transform and a discrete cosine transform.

6. A method as claimed in claim 1 in which the variation code is determined by differencing at least two of the sample strings.

7. A method as claimed in claim 1 in which the variation code is in the form of a string.

8. A method as claimed in claim 1 in which the overall variation code is in the form of an array.

9. A method as claimed in claim 1 in which the steps of generating the variation code includes applying a digital transform to a measure which is indicative of the variation between the sample strings.

10. A method as claimed in claim 9 in which the digital transform is a quantizer.

11. A method as claimed in claim 1 in which the steps of generating the variation code include applying a digital transform to a measure indicative of the variation between the sample stings.

12. A method as claimed in claim 11 in which the digital transform is a frequency-transform.

13. A method as claimed in claim 11 in which the digital transform is one of a wavelet transform, a fast Fourier transform and a discrete cosine transform.

14. A method as claimed in claim 1 in which the image is a biometric image.

15. A method as claimed in claim 14 in which the characteristic identified is the identity of an individual human or animal.

16. A method as claimed in claim 15 in which the identifying step comprises the step of comparing the variation code with known variation codes of respective known individuals.

17. A method as claimed in claim 15 in which the identifying step comprises the steps of determining a Hamming distance between the variation code and a known variation code, and identifying a match if the distance is less than a threshold value.

18. A method as claimed in claim 1 in which the image is that of a human or animal iris.

19. A method as claimed in claim 18 in which the sample strings are obtained directly from the iris image, without the prior application of any shape-changing transform.

20. A computer program product comprising a computer readable medium having computer readable program code embodied therein to execute the method of claim 1.

21. An apparatus for identifying a characteristic of an image comprising:
 a) means for obtaining from the image a plurality of digitised sample strings, each sample string representative of one or more linear image samples;
 b) means for generating from the sample strings a variation code indicative of variation between the sample strings by applying a vector operator to the sample strings to generate a variation code, and
 c) means for repeating steps (a) and (b) to generate a plurality of variation codes, said variation codes together defining an overall variation code; and
 d) means for identifying a characteristic of the image in dependence upon all or part of the overall variation code.

22. A method of identifying a characteristic of an image comprising the steps of:
 (a) generating a biometric image of a biometric of a person;
 (b) obtaining from the biometric image a plurality of digitised sample strings, each sample string representative of one or more linear image samples;
 (c) generating from the sample strings a variation code indicative of variation between the sample strings by applying a vector operator to the sample strings to generate a variation code, and
 d) repeating steps (b) and (c) to generate a plurality of variation codes, said variation codes together defining an overall variation code; and
 (e) identifying a characteristic of the image in dependence upon all or part of the overall variation code.

* * * * *

UNITED STATES PATENT AND TRADEMARK OFFICE
CERTIFICATE OF CORRECTION

PATENT NO. : 7,650,020 B2  Page 1 of 1
APPLICATION NO. : 11/596655
DATED : January 19, 2010
INVENTOR(S) : Donald Martin Monro It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 16 days.

Signed and Sealed this

Twenty-eighth Day of December, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,650,020 B2 |
| APPLICATION NO. | : 11/596655 |
| DATED | : January 19, 2010 |
| INVENTOR(S) | : Donald Martin Monro |

It is certified that error appears in the above-identified patent and that said Letters Patent is hereby corrected as shown below:

Column 1, Line 3, insert the heading --DESCRIPTION-- below the title of the patent.

Column 1, Line 4 (approximately), below the above new heading "DESCRIPTION", insert the heading --CROSS-REFERENCE TO RELATED APPLICATIONS--

Column 1, Line 4 (approximately), below the above new heading "CROSS-REFERENCE TO RELATED APPLICATIONS", insert --This Application is a U.S. National filing under § 371 of International Application No. PCT/GB2005/002156, with an international filing date of 1 June 2005, now pending, claiming priority from Great Britain Application No. GB2004/12175.2, with a filing date of 1 June 2004, now pending, and herein incorporated by reference.--

Column 1, Line 4 (approximately), below the above new heading "CROSS-REFERENCE TO RELATED APPLICATIONS" and its subsequent new paragraph, insert the heading --TECHNICAL FIELD--

Column 1, Line 8, below the paragraph ending with "fingerprint." insert the heading --BACKGROUND OF THE INVENTION--

Column 1, Line 30, below the paragraph ending with "access." insert the heading --SUMMARY OF THE INVENTION--

Column 2, Line 13, below the paragraph ending with "rates." insert the heading --BRIEF DESCRIPTION OF THE DRAWINGS--

Column 2, Line 26, below the paragraph ending with "identified." insert the heading --DETAILED DESCRIPTION OF THE INVENTION--

Signed and Sealed this
Twenty-ninth Day of March, 2011

David J. Kappos
*Director of the United States Patent and Trademark Office*